Sept. 3, 1929.  A. W. SEVERANCE  1,727,253
DRAG FOR IRRIGATION DITCHES
Filed Feb. 4, 1928
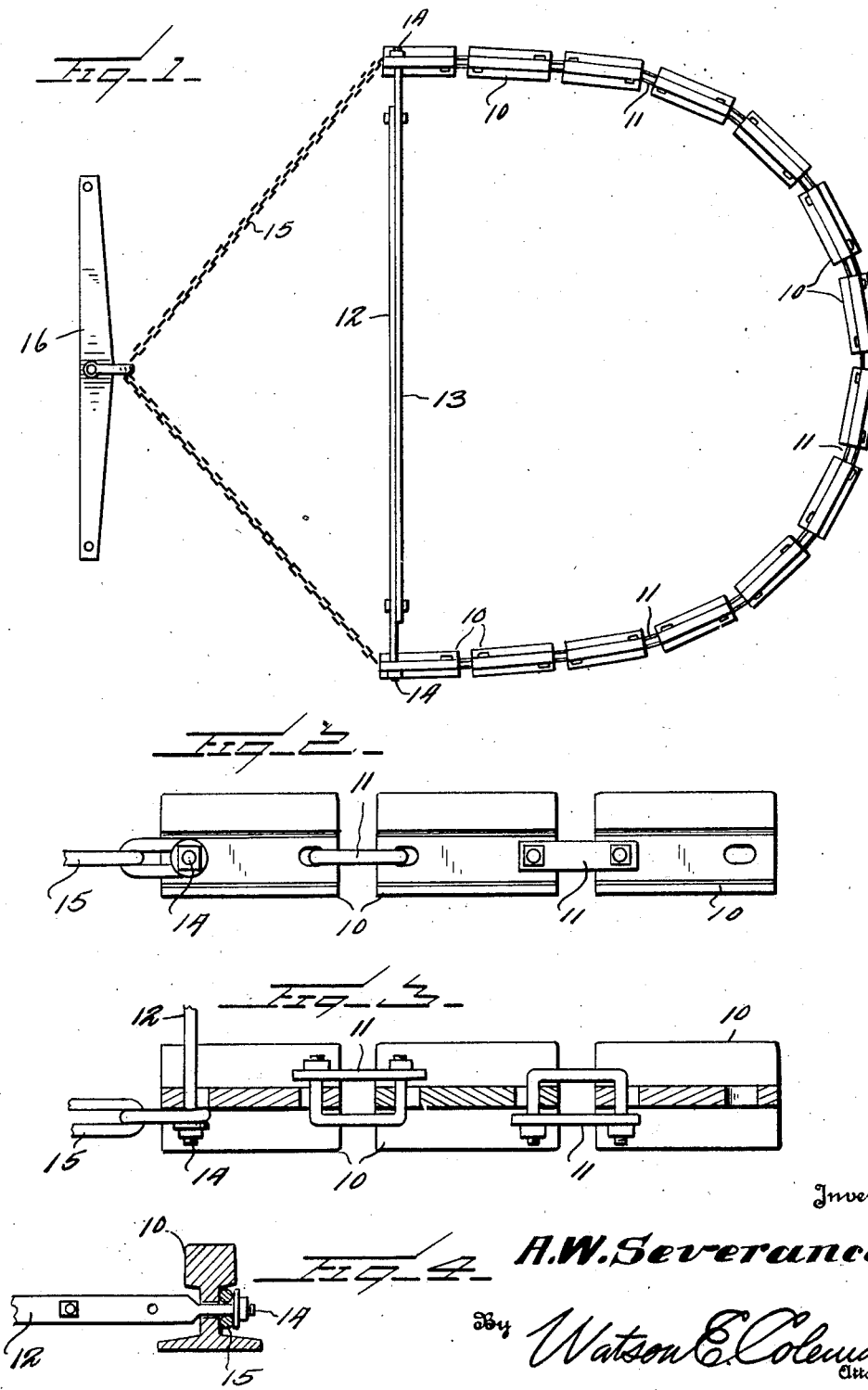

Patented Sept. 3, 1929.

1,727,253

UNITED STATES PATENT OFFICE.

ABEL W. SEVERANCE, OF DONALD, WASHINGTON.

DRAG FOR IRRIGATION DITCHES.

Application filed February 4, 1928. Serial No. 251,960.

This invention relates to devices for cleaning irrigation ditches of weeds, grass, débris of various kinds, etc., and the general object of the invention is to provide a very simply constructed, easily used and effective device of this character which includes a flexible element formed of a series of heavy flexibly connected members, such as sections of railroad iron, so connected to each other that the drag so formed may be hauled along the ditch and will act to level the bottom of the ditch and clean out the weeds, moss, grass and other débris.

My invention is illustrated in the accompanying drawing, wherein:—

Figure 1 is a top plan view of a ditch drag constructed in accordance with my invention;

Figure 2 is an enlarged fragmentary elevation thereof;

Figure 3 is an enlarged fragmentary longitudinal section thereof;

Figure 4 is a fragmentary section through one of the end members 10 showing the connection of the cross bar thereto;

Referring to this drawing, it will be seen that the drag consists of a plurality of sections of railway rail or equivalent members, designated 10. Any number of these members may be used but in actual practice and in the embodiment shown there are thirteen of these sections. These sections are connected to each other by ordinary clevis links 11 which are engaged with the ends of the sections. The interconnected sections are curved so as to form an approximately semicircle and are connected by a cross bar formed in two sections 12 and 13. These sections of the cross bar are flexibly connected by links 14 to the end sections of railway iron 10. The cross pieces 12 and 13 overlap each other and are each provided with a plurality of bolt openings through which bolts may be passed. These overlapping sections may thus be adjusted upon each other so as to expand or contract the cross bar and thus adapted the drag for wider or narrower ditches.

To the adjustable cross bar formed of the two sections as previously described, any suitable draft means is attached. Thus, for instance, I have shown a chain 15 attached at its ends and to the middle of this chain is fastened a doubletree 16 or any other draft device of like character.

In the use of this device, the team is driven up or down an irrigation ditch and in the ditch while there is a full head of water. The drag levels the bottom of the ditch, cleans out all the weeds, moss and other débris, and leaves the ditch in a particularly good condition so that thereafter it may be kept clean at a small cost. The device may have a greater or less number of sections 10 and these may be of any desired length but in practice they will be about twelve inches long. Attention is called to the fact that the sections are formed of short pieces of railway rails, as before remarked, about twelve inches long. These railway rails are approximately I-shaped in cross section and are relatively heavy, and each section is provided with the relatively sharp flanges formed by the base of the rail and projecting round flanges formed by the head of the rail. In drawing the drag along the bottom of the ditch, the flanges formed at the base of the rail tend to cut and scrape away the weeds, moss, etc., in the ditch.

To illustrate the value of this device, it may be stated that in the State of Washington it cost a certain irrigation district $3,800 to clean out the ditch with scrapers, other tools and with teams by ordinary methods, whereas this device has been shown by actual practice to be capable of cleaning the ditches of the same irrigation district at a cost of only $400 and the use of the drag leaves the ditches in such condition that in the spring there will be very small expense necessary in order to get the ditch into proper condition for the irrigation season.

I claim:—

1. A cleaning drag for irrigation ditches comprising a plurality of interlinked sections, each section having a cross section approximately that of a standard railroad rail to provide projecting flanges and each section being relatively heavy, the sections being flexibly connected to each other and having means whereby draft may be applied to the ends of the sections.

2. A cleaning drag for irrigation ditches comprising a plurality of interlinked sections, each section having a cross section approximately that of a standard railroad rail to provide projecting flanges, and each section being relatively heavy, the sections being flexibly connected to each other, an adjustable cross bar connecting the ends of the interlinked sections, and means for applying draft to said cross bar.

3. A cleaning drag for irrigation ditches comprising a plurality of relatively heavy sections, each section having a cross section substantially that of a standard railroad rail to provide laterally projecting base flanges, a head and a web connecting the head to the base flanges, U-bolts passing through the ends of the webs of the adjacent sections, a cross bar connecting the ends of each U-bolt, the apertures in the webs of the sections being relatively large to permit the sections to shift readily with relation to each other, the sections being disposed in a curve and the ends of the connected series of sections being connected to each other, and means whereby draft may be applied to the connected ends of the series of sections.

In testimony whereof I hereunto affix my signature.

ABEL W. SEVERANCE.